(12) United States Patent
Prodic et al.

(10) Patent No.: US 7,622,820 B1
(45) Date of Patent: Nov. 24, 2009

(54) SWITCH-MODE POWER SUPPLY (SMPS) WITH AUTO-TUNING USING LIMIT-CYCLE OSCILLATION RESPONSE EVALUATION

(76) Inventors: Aleksandar Prodic, 2 Withrow ave. Unit 19, Toronto, Ontario (CA) M4K 1C9; Zhenyu Zhao, 10 Northtown Way, Apt. #803, Toronto, Ontario (CA) M2N 7L4; David Chalmers Schie, 22620 Ricardo Rd., Cupertino, CA (US) 95014

( * ) Notice: Subject to any disclaimer, the term of this patent is extended or adjusted under 35 U.S.C. 154(b) by 43 days.

(21) Appl. No.: 12/107,832

(22) Filed: Apr. 23, 2008

Related U.S. Application Data (63) Continuation of application No. 11/687,627, filed on Mar. 16, 2007, now abandoned.

(51) Int. Cl.
*H02M 3/337* (2006.01)

(52) U.S. Cl. .......................... 307/31; 307/38; 361/689; 323/282

(58) Field of Classification Search ............. 363/16–20, 363/21.13, 97, 21.15, 21.01, 56.09, 75, 56.08, 363/21.11; 323/222, 283, 285
See application file for complete search history.

(56) References Cited

U.S. PATENT DOCUMENTS

| | | | |
|---|---|---|---|
| 4,586,121 A | | 4/1986 | Gilliam |
| 5,371,666 A | * | 12/1994 | Miller .......................... 363/98 |
| 5,600,234 A | * | 2/1997 | Hastings et al. ............. 323/282 |
| 6,104,968 A | | 8/2000 | Ananth |
| 6,366,062 B2 | * | 4/2002 | Baretich et al. ............. 323/223 |
| 7,166,992 B2 | | 1/2007 | Kudo et al. |
| 7,315,157 B2 | | 1/2008 | Chapuis |

OTHER PUBLICATIONS

U.S. Appl. No. 11/687,619, filed Mar. 16, 2007, Prodic, et al.
Yao, Kaiwei, "High-Frequency and High-Performance VRM Design for the Next Generations of Processors", PhD Dissertation, Virginia Polytechnic Institute and State University, Apr. 14, 2004, Blacksburg, VA.
Yao, et al., "Control Bandwidth and Transient Response of Buck Converters", IEEE Proceedings of the 2002 Power Electronics Specialists Conference, Jun. 2002 pp. 137-142, Blacksburg, VA.
Qiu, et al., "The Multi-Frequency Small-Signal Model for Buck and Multiphase Interleaving Buck Converters", IEEE Applied Power Electronics Conference and Exposition (APEC) 2005, pp. 392-398, Austin, Texas.

(Continued)

*Primary Examiner*—Rajnikant B Patel
(74) *Attorney, Agent, or Firm*—Mitch Harris, Attorney at Law, LLC (57) ABSTRACT

A switch-mode power supply (SMPS) with auto-tuning using limit-cycle oscillation response evaluation provides optimized performance with reduced capacitance and inductance requirements for a given design. During operation of the SMPS, parameters of the converter are extracted, and the feedback and/or feed-forward compensation is adjusted to either hold the loop bandwidth of the converter near the critical bandwidth of the output capacitors, or maintain output voltage transients within a specified limit. The compensator response is either periodically updated, or is updated in response to an event, such as detection of a transient voltage spike having a characteristic that exceeds one or more predetermined thresholds.

40 Claims, 5 Drawing Sheets

OTHER PUBLICATIONS

Shirazi, et al. "Self-Tuning Point-of-Load Controller", Colorado Power Electronics Center Annual Meeting, Nov. 2006, Boulder CO.
Shirazi, et al., "Autotuning Techniques for Digitally-Controlled Point-of-Load Controllers with Wide Range of Capacitive Loads", Proceedings of the IEEE APEC, p. 14-20, Feb. 2007, Anaheim, CA.
Corradini, et al., "Robust Relay-Feedback Based Autotuning for DC-DC Converters", Proceedings of the IEEE APEC, Feb. 2007, p. 2196-2202, Anaheim, CA.
Kelly, et al., "A Self-Compensating Adaptive Digital Regulator for Switching Converters Based on Linear Prediction" pp. 712-718, Proceedings of the IEEE APEC, Mar. 2006, Anaheim, CA.
Hagen, et al., "Digital Control Measures In-System Response", Power Electronics Technology, Nov. 2006, Overland Park, KS.
Stefanutti, et al., "Autotuning of Digitally-Controlled DC-DC Converters Based on Relay Feedback", IEEE Trans on Power Electronics, vol. 22, No. 1, Jan. 2007.

* cited by examiner

SWITCH-MODE POWER SUPPLY (SMPS) WITH AUTO-TUNING USING LIMIT-CYCLE OSCILLATION RESPONSE EVALUATION

The present application is a Continuation of U.S. patent application Ser. No. 11/687,627, filed on Mar. 16, 2007 now abandoned.

BACKGROUND OF THE INVENTION

1. Field of the Invention

The present invention relates generally to compensation of switch-mode power supplies, and more specifically, to a switch-mode power supply in which the compensation is auto-tuned dynamically during operation.

2. Background of the Invention

Switching power converters, referred to as switch-mode power supplies (SMPSs) are currently in widespread use for applications such as systems power supplies, AC power inverters, as well as localized power supplies such as voltage regulator modules (VRMs). In a SMPS, one or more magnetic storage elements such as inductors or transformers are energized and interrupted by a switching circuit and the stored energy is typically periodically transferred to one or more capacitive storage elements. The output voltage or output current (or an analog of the output voltage/current) of the SMPS is sensed by a sensing circuit and used to control the switching circuit so that voltage or current regulation is provided over a variety of input voltage, output load and temperature variation ranges.

A compensation circuit or "compensator" is provided in the feedback and/or feed-forward paths of the converter between the sensing circuit and the switching circuit and sets the control response of SMPS to the sensed output voltage and/or current. The compensator modifies the closed-loop response of the converter response to ensure that the converter is stable and ensure other operating conditions. The crossover bandwidth is the bandwidth at which the converter loop gain becomes unity, and is a function of the reactance and resistance of the above-mentioned inductive and capacitive storage element(s), as well as the open loop gain of the converter circuits and the compensator. The crossover bandwidth is set to a frequency low enough that the phase shift around the converter loop is less than 180 degrees by a phase margin.

Since the reactance and resistance values of the capacitors and inductors used in SMPS can vary widely both from device-to-device and over temperature and device aging, a very conservative approach to compensation must typically be taken. Device-to-device variations can be compensated-for by production tuning, but at considerable cost and potentially high rejection rates if a conservative design is not chosen. Such conservative designs typically require capacitors having at least 40% greater capacitance than would be necessary for an optimally-tuned SMPS. The capacitors are typically the most expensive components of the SMPS and also one of the largest space and weight consumers, particularly for a high-frequency SMPS, in which the transformers and/or inductors can be made very small.

A conservative design also imposes a limitation on the ability of the SMPS to prevent voltage transients at the output of the power supply that are either due to changing load conditions, or transients at the input of the SMPS. It is possible to decrease the magnitude of voltage transients at the output of an SMPS by increasing the crossover frequency up to a limit known as the "critical frequency" or "critical bandwidth", above which the transients are not reduced by increasing the bandwidth of the loop. The equivalent series resistance (esr) of the output capacitor(s), as well as the capacitance is determinative of the critical bandwidth of a converter, as the capacitor receives all of the inductor current if the load current is suddenly reduced and the additional current from the inductor causes a voltage increase due to the capacitor impedance. Therefore, in order to either meet a predetermined transient voltage specification, or to provide optimum transient performance, it is desirable to provide an SMPS loop response that approaches the critical bandwidth.

However, even if a particular set of storage element parameters is known for an off-the-shelf SMPS design, the connected load will change the characteristics of SMPS operation so that an ideal response is not possible for all applications. For example, when an SMPS is connected to digital equipment, the power supply distribution buses typically have large amounts of capacitance provided for decoupling and local energy storage to reduce the amplitude of transient voltage due to digital switching. The amount of capacitance will vary from application to application and the esr of the external capacitance and for some capacitor types (e.g., aluminum electrolytic capacitors) the capacitance itself will vary widely with operating temperature.

The design of such an "ideal" converter is further exacerbated for manufacturers of controller integrated circuits (Ics) intended for use in off-the-shelf SMPSs or use by other manufacturers in on-board SMPS designs that form part of a larger sub-system. The controller ICs must be able to implement SMPS compensators not only in varying applications, but for SMPS designs with wide ranges of storage element reactances and resistances.

Theoretically, a digital or analog compensator could be provided with tuning control to adjust the feedback response applied between the sensing circuit(s) and the switching circuit of an SMPS, so that the above variations can be taken into account. In particular, digital compensators, which are essentially digital filters, integrators and or integator/differentiator circuits, can implement almost completely arbitrary frequency and phase responses. However, the response of the converter must be obtained in order to determine the appropriate compensator and therefore the above-mentioned parameters of the converter must be extracted or the converter response otherwise measured, in order to adjust the compensator response.

Auto-compensation techniques have been attempted at converter start-up that measure the response of the converter by injecting a signal such as a pseudo-random noise signal. However, such techniques do not measure the converter response under actual loading and operating conditions and cannot be used during actual converter operation. Converter output noise, electromagnetic interference (EMI) and transient voltage specifications will typically not permit such signal/noise injection during operation, and differentiating between the converter response due to the injected signal versus the behavior of the SMPS line or load conditions is at least problematic, if not impossible. Further, once compensation has been chosen, the SMPS performance still varies with temperature and line/load conditions, and therefore a compensator design must still be chosen in a manner sufficiently conservative to account for the possible future variations in the above-mentioned conditions, as well as for production component tolerances.

Therefore, it would be desirable to provide a method and system for auto-tuning an SMPS compensator during converter operation that can account for temperature, device aging, load/line condition variations and production component parameter variation. It would further be desirable to provide such a method and system that introduces little or no interference with normal converter operation. It would also be desirable to provide such a method and system that can either maintain a predetermined transient voltage specification with a less-than-typically conservative compensator design, or provide optimized bandwidth performance for a particular set of converter parameters and operating conditions.

SUMMARY OF THE INVENTION

The above stated objectives, as well as others, are achieved in a method and system for compensation in a switched-mode-power supply (SMPS). The method is a method of operation of the system, which may be integrated in a SMPS controller integrated circuit (IC).

The system includes a parameter extraction circuit that periodically or continuously determines the parameters of the SMPS under regular operation of the SMPS, and a compensator having response adjustment inputs coupled to the parameter extraction circuit, so that the compensator response is adjusted in conformity with the determined parameters.

The parameter extraction circuit may be a circuit that observes the response of the converter to limit-cycle oscillations (LCOs) and determines at least a portion of the parameters from the converter LCO response. The LCOs may be initiated by altering the resolution of a modulator that provides the control input to the SMPS switching circuit, such as a pulse-width modulator (PWM).

The response of the compensator may be updated on a periodic basis, or upon detection of an event such as a voltage transient on the output of the SMPS that exceeds a predetermined threshold imposed on one or more characteristics of the transient.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses switch-mode power supplies (SMPSs) and methods of operation of SMPSs that obtain improved performance and wider control circuit applicability by auto-tuning the SMPS compensation by adjusting a compensator transfer function either periodically or in response to a detected event. The SMPSs extract parameters that are at least partially determinative of the characteristic response of the converter during regulative operation of the converter, i.e., while the converter is servicing a load, as opposed to techniques that attempt to determine the response of the converter during startup or by isolating the load and perturbing the loop. The parameters can be extracted by a technique that introduces limit cycle oscillations (LCOs) and measures their characteristics. Since the limit cycle oscillations will occur during ordinary SMPS operation when the modulator is oscillating between adjacent values, LCOs are generally tolerable in SMPS operation and performance specifications, and therefore do not disrupt the performance of the SMPS. Other techniques such as startup inductance and temperature measurements can be used to further inform the parametric information, which is then used to adjust a digital compensator to achieve one or more of several possible goals. The techniques of the present invention can also be used advantageously in multi-converter applications such as distributed power architectures (DPA) and parallel converters.

In one embodiment of the invention, the digital compensator is used to maintain converter operation as close as possible to the critical bandwidth of the converter less a small safety margin, producing the best possible transient response and therefore the lowest voltage transients at the output under changing load and line conditions. In another embodiment of the invention, the digital compensator is adjusted to maintain the lowest possible transient voltage response for all possible input and load transients. In yet another embodiment of the invention, the phase margin of the SMPS is maintained at a constant predetermined value. In each of the above embodiments, the required input and output capacitor sizes are reduced by controlling the variation of the closed-loop response. Therefore, a smaller capacitance can be chosen in a particular implementation and still maintain performance at levels that without the present invention, would require larger capacitors.

Figure 1:
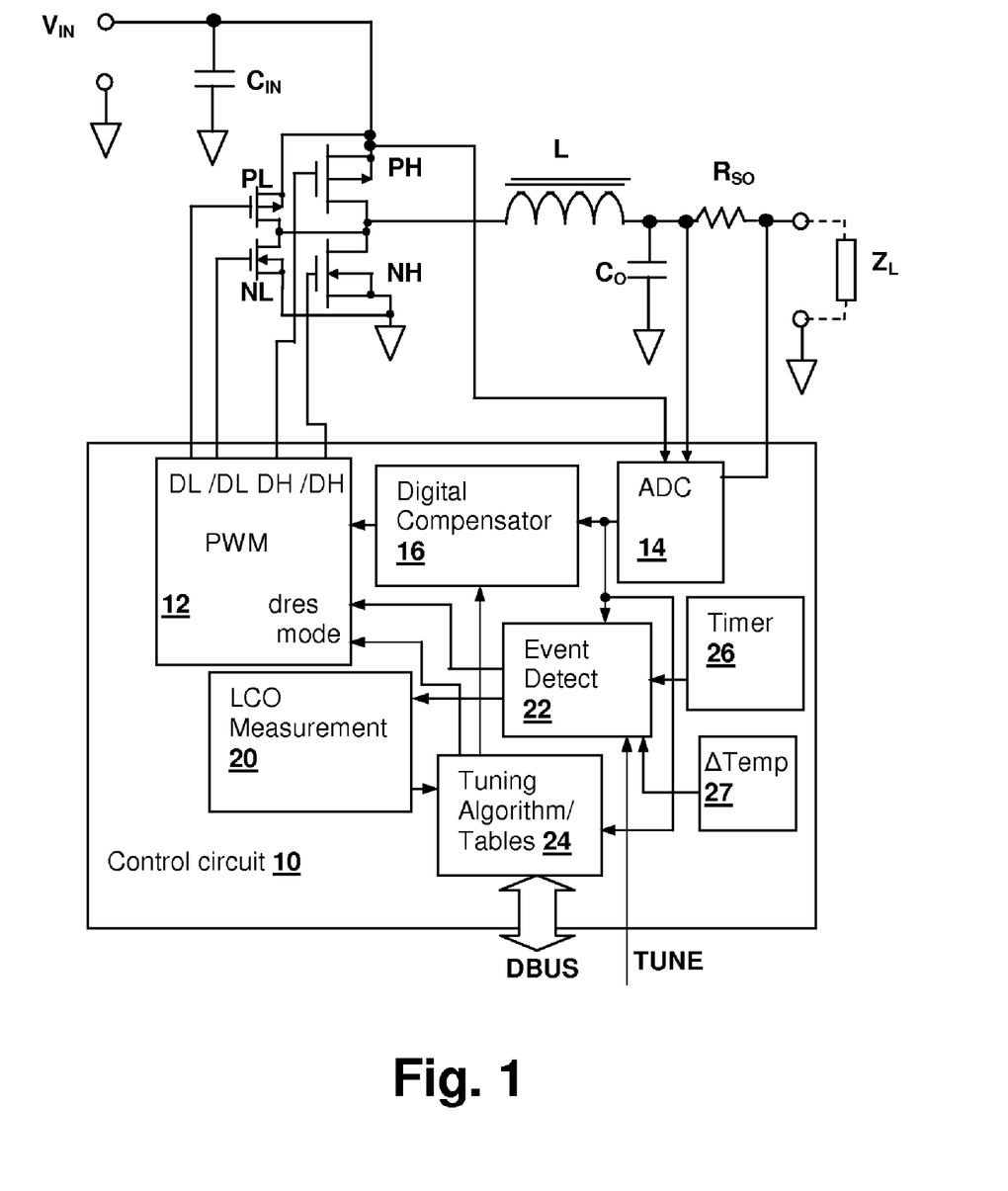
FIG. 1 is a schematic diagram depicting an SMPS in accordance with an embodiment of the invention.

Referring now to the Figures, and in particular to FIG. 1, an SMPS in accordance with an embodiment of the present invention is shown. The depicted converter is a DC-to-DC buck converter, but it is understood that the techniques of the present invention apply to SMPSs of other topologies and input/output voltage types, as SMPSs in general have feedback or feedforward compensators that remove the low frequency resonances due to the storage elements and then attenuate the gain of the converter above a frequency at which: 1) performance cannot be improved by extending the response, 2) performance cannot be improved without introducing instability, or 3) the loop bandwidth would approach the switching frequency of the SMPS.

An input voltage $V_{IN}$ is provided on a pair of input terminals and stored on capacitor $C_{IN}$. A switching circuit including transistors PH, NH, PL and NL switch a first terminal of an inductor L current between terminal of capacitor $C_{IN}$ and ground. Transistors PH and NH are sized larger than transistor PL and NL and provide for a segmented switch in which control circuit 10 activates transistors PH and NH only when current demand is high, and transistors PL and NL under both high and low current demand conditions. The result is an improvement of efficiency under low current demand conditions, since the drive demands of charging the gates of large transistors PH and NH can exceed the losses in the higher resistance channels of transistors PL and NL when current demand is low. In the present invention, the decision point for activating large transistors PH and NH during switching is made in conformity with parameters determined by control circuit 10 during the auto-tuning process, and therefore provides improved efficiency over previous power supplies in which the decision to activate the larger sized segments of the switching circuit is made based upon voltage droop or current consumption measurements.

The second terminal of inductor L is connected to an output capacitance $C_O$, which may be a single capacitor $C_O$ or a capacitor bank. Capacitor $C_O$ is coupled to terminals adapted for connection to a load, represented in the Figure by an impedance $Z_L$, through a sense resistor $R_{SO}$. Sense resistor $R_{SO}$ is included in the depicted circuit as an example of a technique for measuring the output current of the depicted SMPS. However, it is understood that there are many techniques for determining the SMPS output current, such as input side current reflection or sense windings, and any of those techniques may be used advantageously in the present invention to provide control circuit 10 with output current information.

Control circuit 10 operates the switching circuit formed by transistors PH, NH, PL and NL in accordance with a control loop provided by analog-to-digital converter (ADC) 14 and digital compensator 16 that operates a pulse-width modulator (PWM) 12. PWM 12 is exemplified by a digital pulse-width modulator (DPWM), but it is understood that other modulator types such as analog PWMs and digital pulse frequency modulators (DPFM) can be used in alternative embodiments of the present invention. Analog-to-digital converter 14 is able to provide information to digital compensator 16 regarding output voltage, input voltage and output current, but in a particular embodiment, not all of the above-mentioned input variables may be present. At a minimum, for voltage-mode control, at least the output voltage is measured by ADC 14 and for current-mode control, generally the output current will be measured as well, unless a technique to extrapolate the output current from output voltage variation is used. Output current will generally be measured in some form even with voltage-mode control for implementing over-current protection. The most general and flexible set of inputs for parameter measurement and consequent SMPS compensation control will provide measurement of both input and output voltage/current, as the actual inductance value can be determined from the output current and input voltage. However, the input voltage may be obtained from observation of the duty cycle and the error signal, and therefore the input voltage does not have to be measured directly in order to obtain the actual inductance of inductor L.

The primary parameter of the SMPS that is used to control digital compensator 16 is the characteristic frequency response of the converter, which is determined by an LCO measurement unit 20 that receives a signal from event detector 22 to commence measurement. Event detector 22 may be periodically operated by a timer 26 or an external logical TUNE signal, but is desirably triggered by detection of an event detected by event detector 22 from information provided by ADC 14, such as a voltage transient at the output terminals of the SMPS circuit or a change in temperature. Event detect 22 may determine the amplitude, shape (Q) and/or other characteristics of a transient and decide based on one or more thresholds, that an auto-tune cycle should be triggered. A temperature change sensing circuit 27 may be included for measuring temperature, so that thermal changes can be detected and adjustments made to the compensating response of digital compensator 16 as the operating temperature changes component values. The TUNE input signal may be used in some implementations to qualify event-detection triggered auto-tuning, so that auto-tuning is prevented in environments where a change in SMPS compensator is not allowed. Event detector 22 also provides a dres signal to pulse-width modulator (PWM) 12, which reduces the resolution of the PWM 12 output that controls the switching circuit, in order to introduce LCOs. The dres signal may be a multi-bit signal corresponding to multiple levels of resolution reduction, and the level of reduction may be increased progressively until LCO measurement circuit 20 has completed a successful LCO measurement.

LCO measurement circuit 20 measures the amplitude and/or frequency of the LCOs and provides information to a tuning algorithm block 24, which may be a set of parameter tables, or an combinatorial block that provides outputs that set the coefficients of digital compensator in conformity with the LCO measurement information obtained by LCO measurement block 20. The combination of LCO measurement block 20 and tuning algorithm block 24 acts as a parameter extraction circuit that extracts parameters of the SMPS and tunes digital compensator 16 to achieve the compensation goals as delineated above, e.g., optimized transient response, minimized transient amplitude or predetermined/maximized phase margin. The resulting control of compensator 16 as against component, environmental and load variations permits use of smaller capacitance values for $C_{IN}$ and $C_O$. Other parameters as mentioned above may be included in the tuning algorithm and computed by tuning algorithm block 24 from information provided by ADC 14, such as actual inductance, capacitance and capacitor esr determined from input voltage, output voltage and current measurements. Further, as illustrated, tuning algorithm block 24 may include a parallel or serial digital I/O bus DBUS for providing information about the parameters of the SMPS, so that information about SMPS component aging and operating conditions can be read by, for example, a microcontroller or microprocessor operating a power management system. The information can be used to provide prediction of impending failure or to otherwise monitor SMPS health. Further I/O bus DBUS can be used to provide tuning information to digital compensator 16, for example, to set particular compensation table sets for known parameters or ranges of parameters of the SMPS, to be used in conjunction with the LCO parameter extraction, to selectably override LCO based compensation, and/or to provide the capability of an external processor in implementing tuning algorithms. For example, information from LCO measurement circuit 20 can be provided to an external processor via digital I/O bus DBUS and computed compensation coefficients can be set by the external processor to control the response of digital compensator 16. Further, tuning algorithm block 24 provides a mode select signal to PWM 12 that selects activation of only the low current-demand segment transistors PL and NL when the current demand is low as determined from information provided by ADC 14, with a decision point further informed by parameter information received by tuning algorithm block 24 in order to provide the decision point for optimum SMPS efficiency at all current demand levels. Ultimately, an SMPS controller can be constructed that can self-program for a wide range of applications, so that the compensator does not have to be pre-programmed or adjusted for particular SMPS component values, yielding a true universal SMPS controller IC. Finally, the use of digital compensator 16 removes the variation that occurs with typical analog compensation circuits, which use capacitors and resistors to control the locations of compensating zeros and poles and have initial (DC) gain values that may vary substantially.

In order to perform the above optimizations of the SMPS by adjusting digital compensator 16, LCO measurement block 20 and optionally the inductance value and esr value computations mentioned above must inform tuning algorithm block 24 of parameters of the SMPS as determined by the components external to control circuit 10. For transient voltage/transient response control methodologies, the relationship between critical bandwidth, and the control bandwidth (the bandwidth up to the crossover unity gain frequency) is the primary mechanism of control. Up to the critical bandwidth, the control bandwidth determines the SMPSs response to line and load transients. Above the critical bandwidth, the response to transients is dictated by the esr of the output capacitor $C_O$. Therefore, tuning algorithm block 24 can determine not only the coefficients of digital compensator 16 that are necessary to place the crossover as close as practical to the critical bandwidth, but can also determine for a measured value of esr, whether or not increasing the control bandwidth will provide any added benefit in improving transient response. For phase margin control, the characteristic response of the SMPS provides a measure of how low the crossover frequency must be set in order to maintain a particular phase margin. As mentioned above, tuning algorithm block 24 can use the parameters that determine the characteristic response of the SMPS to set a compensating response that achieves a transient response control or phase margin control goal.

Another advantage of parameter extraction based auto-tuned compensation is that compensators such as proportional integral-derivative (PID) compensators can be used, while achieving predictable unit-to-unit operation over component value variation, component aging and operating temperature variations. With auto-tuning, two zeros can be established in the PID response which exactly or nearly exactly cancels the SMPS characteristic response poles. Since the maximum phase shift of the PID is 90 degrees, the SMPS phase margin will never be less than 90 degrees, as long as the zero caused by the esr of the output capacitor is sufficiently above the crossover frequency. The gain of the integrator can be tuned to set the crossover point.

Figure 2:
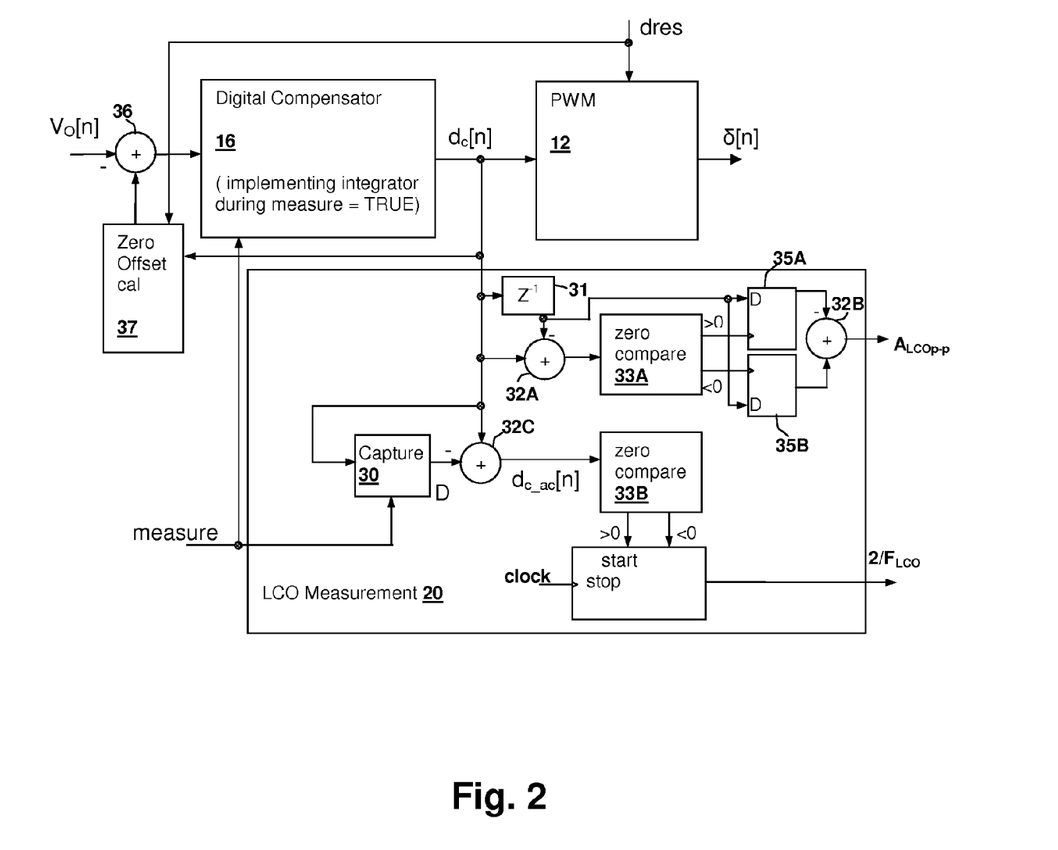
FIG. 2 is a schematic diagram depicting details within control circuit 10 of FIG. 1, in accordance with an embodiment of the invention.

Referring now to FIG. 2, details of an exemplary embodiment of portions of control circuit 10 of FIG. 1 are depicted. LCO measurement block 20 determines at least a portion of the parameters that inform tuning algorithm block 24 in order to select or tune a response of digital compensator 16. As mentioned above, when tuning is initiated, the resolution of PWM 12 is temporarily reduced, which introduces additional non-linearity in the loop. The resultant LCOs do not cause significant output voltage variations, as at the lowest level of resolution reduction in PWM 12, the LCOs correspond to actual events that do occur when the steady-state PWM control value is near a resolution cell boundary, and a slightly higher levels of resolution reduction, still represent very small changes in the output voltage. As such, the techniques of the present invention are superior to other techniques that may introduce instabilities in the converter, or otherwise inject signals that cause significant output voltage variation, and therefore are not generally used during regular operation of an SMPS. Further, since the resolution of ADC 14 remains the same, the waveform resulting from the LCOs is observable as a multi-level waveform at the output of the SMPS, even though the causative non-linearity may be, for example, approximately a single resolution step of the PWM 12. The present invention advantageously uses ADC 14 and the gain of digital compensator 16 to amplify the LCO waveform so that suitable dynamic range in the LCO characteristic measurement is obtained. In another sense, the resolution of the control variable provided at the output of digital compensator 16 has not been reduced in resolution, while the resolution at the output of PWM 12 has been reduced in resolution, so that several values of control variable correspond to a single duty ratio value, at least during the LCO measurement interval. Therefore, the technique is inherently stable compared to techniques that introduce error in the loop without reducing the resolution. The stability is due to the LCOs generally causing no PWM 12 output duty factor change at the lowered resolution. If an LCO did cause the PWM 12 output to change at the lowered resolution, the resultant shift in the feedback control variable would effectively reduce the loop gain with respect to the LCO to unity, damping the oscillation. Because PWM 12 provides a large number of control states during LCO measurement, the loop will always cause a shift to a stable operating point, whereas a system that uses only two control states cannot ensure stability without additional circuitry.

In the circuit of FIG. 2, a measure signal is provided that sets the response of digital compensator 16 to the response of a simple integrator: K/s. Providing an integrator as the response of digital compensator 16 provides a high gain with respect to changes in the output voltage $V_O[n]$ of the SMPS as sampled by ADC 14, so that LCO characteristics can be easily measured without requiring additional amplifiers or other circuitry. The initial gain of the integrator is chosen so that the SMPS will be unconditionally stable at startup. For example, in a buck converter, the crossover frequency must be chosen to be below the resonant frequency of inductor L with capacitor $C_O$. As the resonant frequency of practical converters can be expected to be lower than a specific frequency, e.g. 1 kHz, it is possible to select such a crossover frequency with confidence that instability will not occur, since no more than 90 degrees of phase shift will have been contributed by inductor L and capacitor $C_O$. To determine the gain of the integrator, the loop gain must be taken into account and the gain factor due to the input voltage must also be removed. For particular converter designs the output voltage/input voltage gain is measured during operation, or known a priori and provided as a programmed parameter for the circuit. Once the SMPS is started using the integrator response, the LCO measurements can be performed to determined the desired compensation for normal operation of the SMPS. However, after startup, a wider bandwidth of the integrator response can be used, since the parameters that determine the gain and phase response are known and there is no need to leave extra margin for variation of component values. Alternatively, other compensation types can be used besides integral responses, with a consequent adjustment to the parameter extraction models so that the differing response is taken into account. For example, the actual compensation employed during operation might be left in place during LCO measurement, if sufficiently accurate parameters can be extracted. Further, startup LCO measurement may be performed as the voltage on the output of the SMPS is still approaching its steady-state value. Once stable (but not steady-state) operation is determined, the LCO measurement can be used to extract the SMPS parameters and then a desired compensating response selected/computed and applied before the SMPS comes on line. If a power ready indication is provided by the SMPS, the LCO parameter extraction can be performed before the conditions for the power ready indication are complete, or the power ready signal may be qualified by completion of the LCO measurement and application of the desired compensation.

To perform the LCO measurements, A combiner 36 subtracts the SMPS output voltage $V_O[n]$ from a zero offset calibration circuit 37 that receives an input from the output of digital compensator 16 and adjusts the input to have an offset that centers the $V_O[n]$ signal in the least-significant bit of the PWM 12 resolution. The dres signal(s) are provided to zero offset calibration circuit 37 so that the required offset can be determined to set the modulator output in the middle of a resolution cell, no matter the input $V_O[n]$ value. For example, when dres reduces the resolution PWM 12, e.g., from 10 bits to 7 bits, and assuming the resolution of ADC 14 is same as that of PWM 12 over the range of input voltage, if input value of $V_O[n]$ would ordinarily generate a modulator output having 001 as the least three significant bits of the 10-bit resolution, a value of 3 is then added by zero offset calibration circuit 37 to the $V_O[n]$ signal, placing the adjusted value directly at the midpoint of the 7-bit resolution cell. The result is that a symmetric LCO is generated, rather than an LCO having symmetry dependent on offset. The zero offset calibration circuit 37 also ensures generation of LCOs even at very high resolutions, since the error will always be ½LSB, which is the maximum, where LCOs may not be otherwise generated for values of $V_O[n]$ corresponding to zero or near-zero error. Further, for symmetric LCOs, assumptions about the LCO shape lead to fairly simple techniques for parameter extraction, whereas modeling asymmetric LCOs generally would require fitting of Airy functions to the waveshapes, or at least use of empirical relations that describe the Airy function behavior. However, the present invention is not limited to the measurement of symmetric LCOs and with sufficient modeling resolution and/or computational power, additional information leading to more detailed parameter extraction may be obtained by measuring asymmetric LCOs as well as symmetric LCOs.

During LCO measurement, LCO measurement block 20 determines an indication of the frequency and amplitude of LCOs using a relatively simple digital circuit, as shown. The maximum amplitude of the LCOs is taken as the sample of the control input $d_c[n]$ provided to PWM 12 immediately prior to a first change in sign of the first difference $d_c[n]-d_c[n-1]$ of control input $d_c[n]$. The minimum amplitude of the LCOs is taken as the sample of the control input $d_c[n]$ provided to PWM 12 immediately prior to a second change in sign of the first difference $d_c[n]-d_c[n-1]$ of control input $d_c[n]$. The first difference $d_c[n]-d_c[n-1]$ is computed by a combiner 32A from control input $d_c[n]$ and the output of a unit delay 31 that provides value $d_c[n-1]$. A zero comparison circuit provides outputs indicating that first difference $d_c[n]-d_c[n-1]$ is greater than zero (>0) or less than zero (<0), and are used to activate positive edge-triggered latches 35A and 35B to store the output $d_c[n-1]$ of unit delay 31 in response to the detection of the first and second sign change of first difference $d_c[n]-d_c[n-1]$, respectively. A combiner 36B subtracts the captured minimum value of $d_c[n]$ stored in latch 35B from the captured maximum value of $d_c[n]$ stored in latch 35A to provide an indication of peak-to-peak amplitude of the LCOs. The discrete differences above correspond to the derivative of the LCO waveform, and other techniques for locating the maxima and minima according to differentiating the waveform may be alternatively applied.

To provide an indication of frequency of the LCOs, a counter 34 is clocked at the sample rate, which is much higher than the LCO period, and is started and stopped by detecting the zero transitions of an AC portion of $d_c[n]$, as determined by a zero comparison circuit 33B. In order to measure only the changes from the steady state value due to the LCOs, the steady-state value of the control variable $d_c[n]$ is removed from the measurement. Control variable $d_c[n]$ is captured prior to the generation of LCOs as the measure signal is asserted by a capture circuit 30, and represents a steady state value D of the control input to PWM 12 in the absence of LCOs. Steady state value D is subtracted from $d_c[n]$ by a combiner 32C that generates an "AC" version of $d_c[n]$ labeled $d_{c\_ac}[n]$. A zero comparison circuit 33B receives $d_{c\_ac}[n]$ and starts/stops counter 34, so that a time between zero crossings of $d_{c\_ac}[n]$ is produced as an indication of the length of a half-period of the LCOs ($2/F_{LCO}$).

The measurement of the frequency and amplitude of the LCOs provides for extraction of parameters of the converter. Since the compensator bandwidth is well known, and in the above example is simplified by using a response of K/s, other parameters of the converter can then be extracted from the measurement results. The amplitude and frequency of the LCOs are related to the SMPS component responses, according to the following relationship:

$$-1(180 \text{ degree phase})=N_{PWM}(A_{LCO},e)G_{vd}(j\omega)K_{ADC}(j\omega)K/j\omega_{LC}$$

where $N_{PWM}$ is the modulator gain and is specified in terms of both the signal amplitude $A_{LC}$ and the offset e, since the gain of PWM 12 is not linear and dependent on where in a resolution cell the signal is centered. $G_{vd}$ is the control-to-output-voltage gain of the converter and $K_{ADC}(j\omega)$ is the response of ADC 14. The modulator gain is accounted for in the circuit of FIG. 2, by the use of zero offset calibration circuit 37 as described above. For the zero-offset condition, the gain of the PWM 12 is given by $N_{PWM}(A_{LC})=4D_q/\pi A_{LC}$, where $D_q$ is the quantization step of PWM 12 when operating at the reduced resolution commanded by the dres signal(s). Since $A_{LCO}$ is measured and $D_q$ is known, the modulator gain is specified for each measurement. $K_{ADC}(j\omega)$ is generally equal to a constant or is well-characterized as is $K/j\omega_{LC}$, for a measured LCO frequency, which is the integrator gain at that LCO frequency. Therefore the gain equation given above at the LCO frequency is solvable as $G_{vd}(j\omega_{LC})=-j\pi\omega_{LC}A_{LC}/4KK_{ADC}D_q$ and as expressed is only dependent on the amplitude and frequency of the measured LCOs.

The above relationship can be used to characterize particular converter types. For example, in a buck converter having a second order control-to-output transfer function $G_{vd}(s)$ can be expressed as:

$$G_{vd}(s) = \frac{v(s)}{d(s)} = G_{d0} \frac{1}{1 + \frac{s}{Q\omega_0} + \frac{s^2}{\omega_0^2}}$$

where $$\omega_0 = \frac{1}{\sqrt{LC}}, \quad Q = R\sqrt{\frac{C}{L}}, \quad \text{and } G_{d0} = V_g = \frac{V}{D}.$$

The output capacitance, inductance and load resistance are denoted by C, L, and R respectively. In the example, it is assumed that the output voltage V is known or measured, and that the steady state value of duty ratio D is extracted from dc value of control variable. Ideally, the frequency of the LCO corresponds to the output filter corner frequency $\omega_O$ at which the phase shift around the loop is 180 degrees. In practice, the frequency is slightly lower, due to additional phase shifts introduced by the delays of the ADC and DPWM. In the estimation of R and Q-factor we assume that the value of inductance L is known or calculated with a certain level of accuracy, and relatively stable, compared to those of the output load and capacitance. To further simplify analysis without loosing generality, we assume unity gain of the analog-to-digital converter and compensator. The solution of the gain equation, gives the following result for the peak-to-peak amplitude of an LCO:

$$A_{pp} = \frac{4}{\pi} D_q G_{d0} \frac{R}{\omega_0 L}$$

By combining the transfer equations above for the buck converter implementation as described above, the expressions for the output resistance and Q-factor become:

$$R = \frac{A_{pp}\omega_0 \pi L}{4D_q G_{d0}} \quad Q = R\frac{\omega_0}{L} = \frac{A_{pp}\pi}{4D_q G_{d0}}$$

These above equations show that by knowing the steady state duty ratio value and analyzing LCO characteristics, all parameters needed for a compensator design and load estimation can be obtained during a single SI and auto-tuning phase.

In another example, a boost converter, having a control-to-output transfer function is described by:

$$G_{vd}(s) = G_{d0} \frac{1 - \frac{s}{\omega_z}}{1 + \frac{s}{Q\omega_0} + \frac{s^2}{\omega_0^2}}$$

where $$\omega_0 = D'/\sqrt{LC}, \quad Q = D'R\sqrt{C/L}, \quad \text{and } \omega_z = \omega_0 Q.$$

In the boost converter, the LCO frequency will not be the same as the SMPS corner frequency but at the point where the converter stages introduce a −90 phase shift. Therefore, the relation describing LCO condition becomes:

$$G_{vd}(j\omega) = \frac{\pi A_{pp}}{4D_q} L \angle -90° = G_{d0} \frac{1 - j\frac{\omega_{LC}}{\omega_z}}{\left(1 - \left(\frac{\omega_{LC}}{\omega_0}\right)^2\right) + \frac{j\omega_{LC}}{Q\omega_0}}$$

By solving assuming that D, V, and L are known, we can obtain all parameters described with the expression for Q given above for the buck converter example. However, it is less complex to implement models are equations describing relations between LCO features and output capacitance and resistance values. The relations are given as follows:

$$R = \frac{\omega_{LC} L B}{D'^2} \quad \text{and} \quad C = \frac{D'^2(B^2 - 1)}{L\omega_{LC}^2 B^2}$$

where, $\omega_{LC}$ is the frequency of the LCOs, and $$B = \frac{A_{pp}\pi}{4D_q G_{d0}}$$

is a constant introduced for simplicity.

In the auto-tuning method of the present invention a non-negligible inductor resistance $R_L$ can cause quantitative changes in the frequency and amplitude of LCO. A more accurate buck converter model, as will be described below, takes inductor resistance $R_L$ into account.

The converter resonant frequency and Q factor are:

$$\omega_0^2 = \frac{R_L + R}{RCL} \quad \text{and} \quad Q = \frac{\sqrt{(R_L + R)RCL}}{CRR_L + L}$$

and the relationships between the amplitude and frequency of LCO and the power stage gain parameters are given by:

$$\omega_{LC}^2 = \frac{R_L + R}{RCL} \quad A_{pp} =$$

$$\frac{4}{\pi} D_q G_{do} \frac{R}{CRR_L + L} \frac{1}{\omega_{LC}} \quad C = \frac{R_L + LB\omega_{LC}}{B\omega(R_L^2 + \omega_{LC}^2 L^2)} \quad \text{and} \quad R = \frac{L + \frac{R_L}{L\omega_{LC}^2}}{\frac{V_g}{B\omega} - \frac{R_L}{L\omega_{LC}^2}}$$

The above expressions show that in a realistic converter model both the amplitude and frequency of LCOs depend not only on the output capacitance but also on the load value. At light loads, the resonant frequency of the converter, observable as the LCO frequency in the buck converter example, can be significantly lower than nominal, causing possible stability problems in non-conservative compensation schemes if the compensator adjustment is not performed after any load changes that occur.

Figure 3:
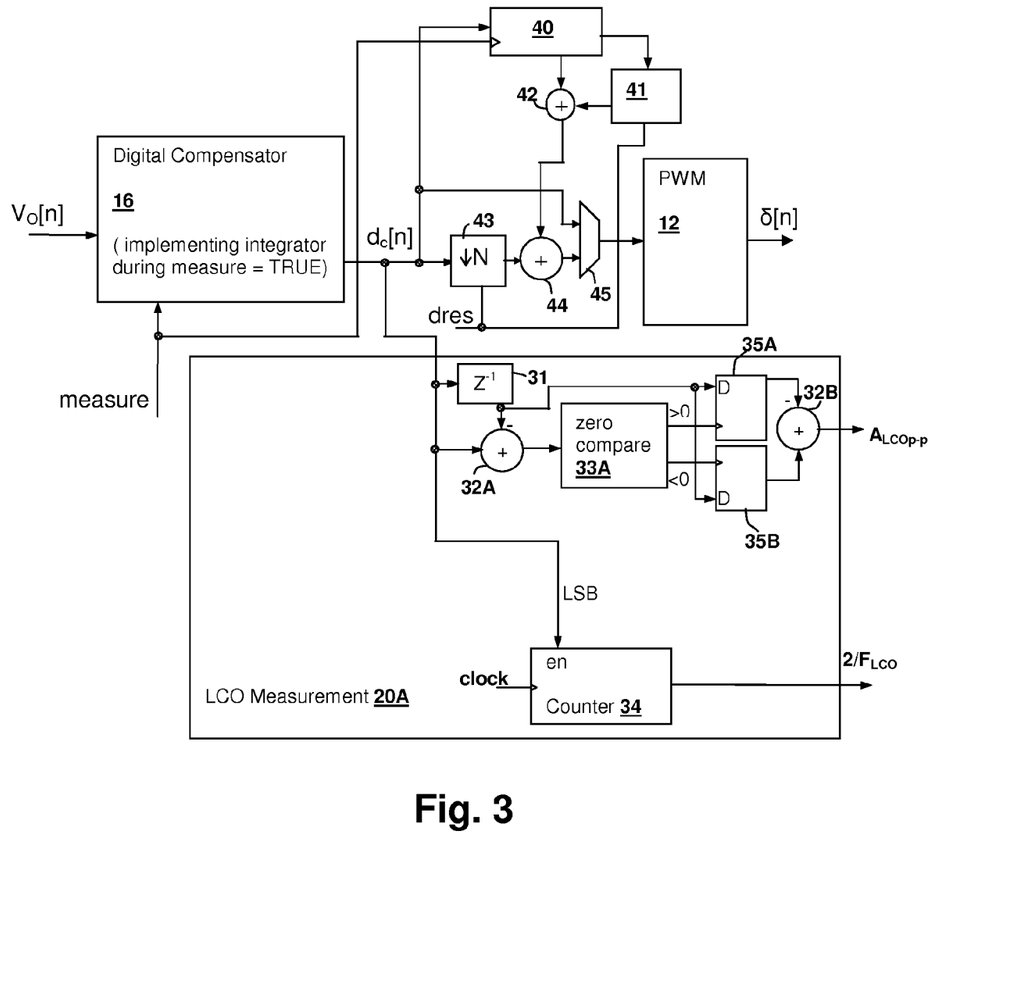
FIG. 3 is a schematic diagram depicting details within control circuit 10 of FIG. 1, in accordance with another embodiment of the invention.

Referring now to FIG. 3, details of another exemplary embodiment of portions of control circuit 10 of FIG. 1 are depicted. In the depicted embodiment, operation and structures are similar to that described with respect to FIG. 2, therefore only differences between the embodiments will be described below. Rather than shifting the $V_O[n]$ signal when the resolution of the modulator is reduced, in the circuit of FIG. 3, the resolution of control variable $d_c[n]$ is reduced external to PWM 12 by a value of control variable $d_c[n]$ is captured by a latch 40, when LCO measurement is commanded by the measure signal. A look-up table 41 (or alternatively combinational logic) provides a shift value for shifting the decimated value of $d_c[n]$ as applied to PWM 12. The value provided by look-up table 41 is the difference between the steady-state value of $d_c[n]$ as captured by latch 40 and the midpoint of the nearest resolution cell of $d_c[n]$ at the higher resolution of PWM 12 prior to initiating LCO measurements. The value provided by look-up table is also generated so that the decimated value of $d_c[n]$ will not change if the steady-state value is presently at the midpoint. A combiner 42 adds (or subtracts) the value provided by look-up table 41, which may be positive or negative, in order to adjust the value of $d_c[n]$ to the resolution cell midpoint. Another combiner 44 combines the output of decimator 43 with the output of combiner 42 to yield the midpoint-adjusted result. A selector 45 selects between control variable $d_c[n]$ and the reduced-resolution shifted value provided from combiner 44. Thus, even though the dres signal(s) causes the input control value to PWM 12 to drop one or more least-significant bits of $d_c[n]$, the adjusted value has the full resolution of PWM 12, with the least significant bits fixed to center the LCO waveform at the midpoint of the resolution cell closest to the steady-state value of control variable $d_c[n]$ prior to the LCO measurement.

LCO measurement circuit 20A also differs slightly from LCO measurement circuit 20 of FIG. 1 and can be used instead of LCO measurement circuit 20 of FIG. 1, whether or not the LCO initiating circuitry described is used as an alternative to the LCO initiating circuitry of FIG. 1. In LCO measurement circuit 20A, the LCO amplitude measurement circuitry is the same as for that of FIG. 1. However, the frequency measuring circuitry is simplified. The least-significant bit of control variable $d_c[n]$ is used to enable counter 34, which provides an accurate indication of the start and stop of a half-period of the LCO waveform.

Figure 4:
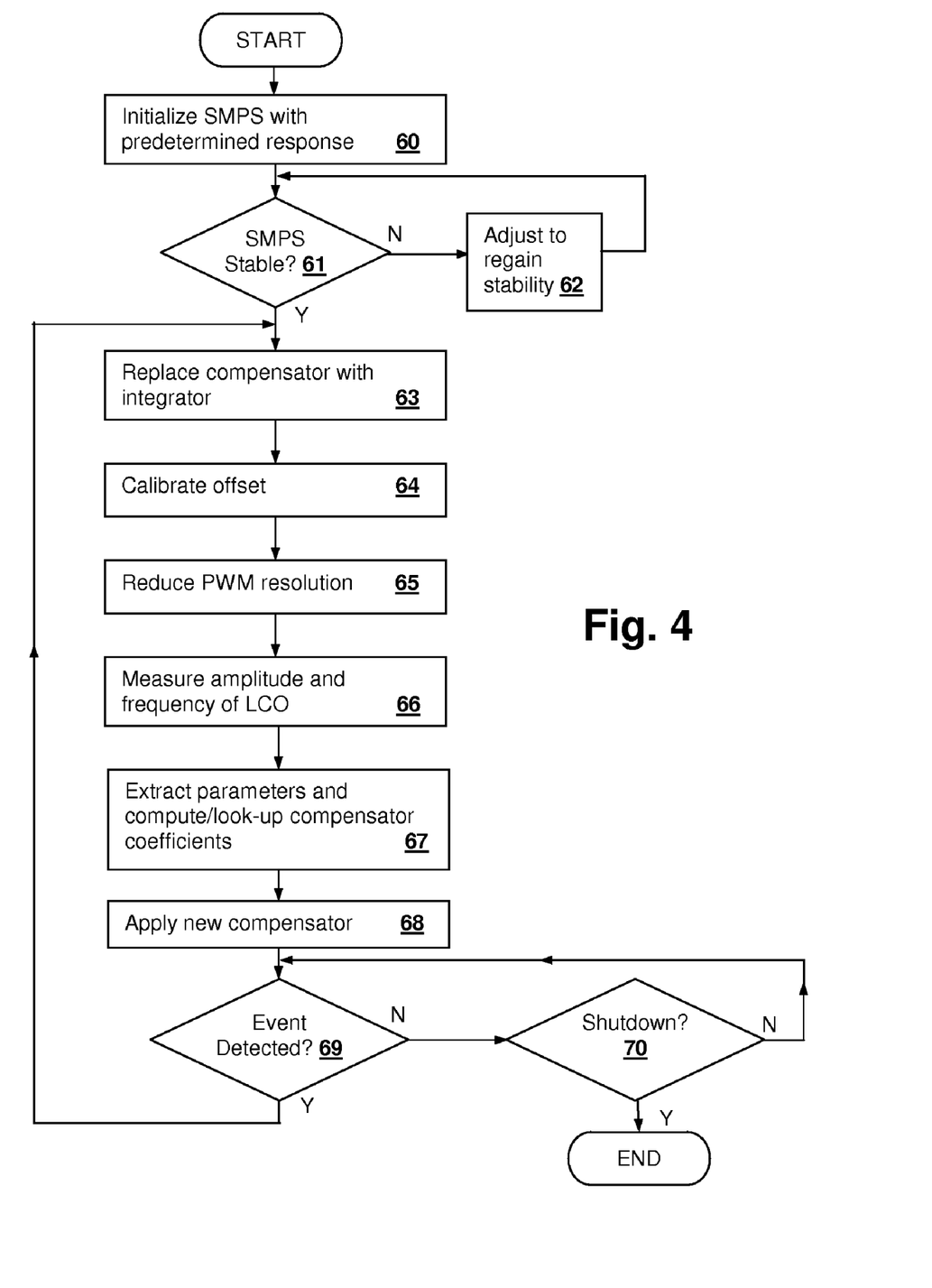
FIG. 4 is a flowchart showing an auto-tuning method in accordance with an embodiment of the invention.

Referring now to FIG. 4, operation of an auto-tuning method in accordance with an embodiment of the invention is depicted in a flowchart. First, the SMPS is initialized with a predetermined response as is generally used in the type of converter circuits employed (step 60). If the loop is unstable (decision 61), then the compensation is adjusted to regain (or attain) stability (step 62). After the loop is stable (decision 61), the compensator is replaced with an integrator response as described in detail above (step 63) and the offset is calibrated (step 64) by zero offset calibration circuit 37. The PWM resolution is then reduced (step 65) and the amplitude and frequency of the LCOs is measured (step 66). Parameters of the converter are extracted from the measured LCO characteristics and the compensator coefficients are computed or retrieved from a look-up table (step 67). Then, the new compensator is applied (step 67) until an event is detected indicating another auto-tuning cycle should be performed (decision 69), at which time steps 63 through step 69 are repeated until the power supply is shut down or the scheme is disabled (decision 70).

Figure 5:
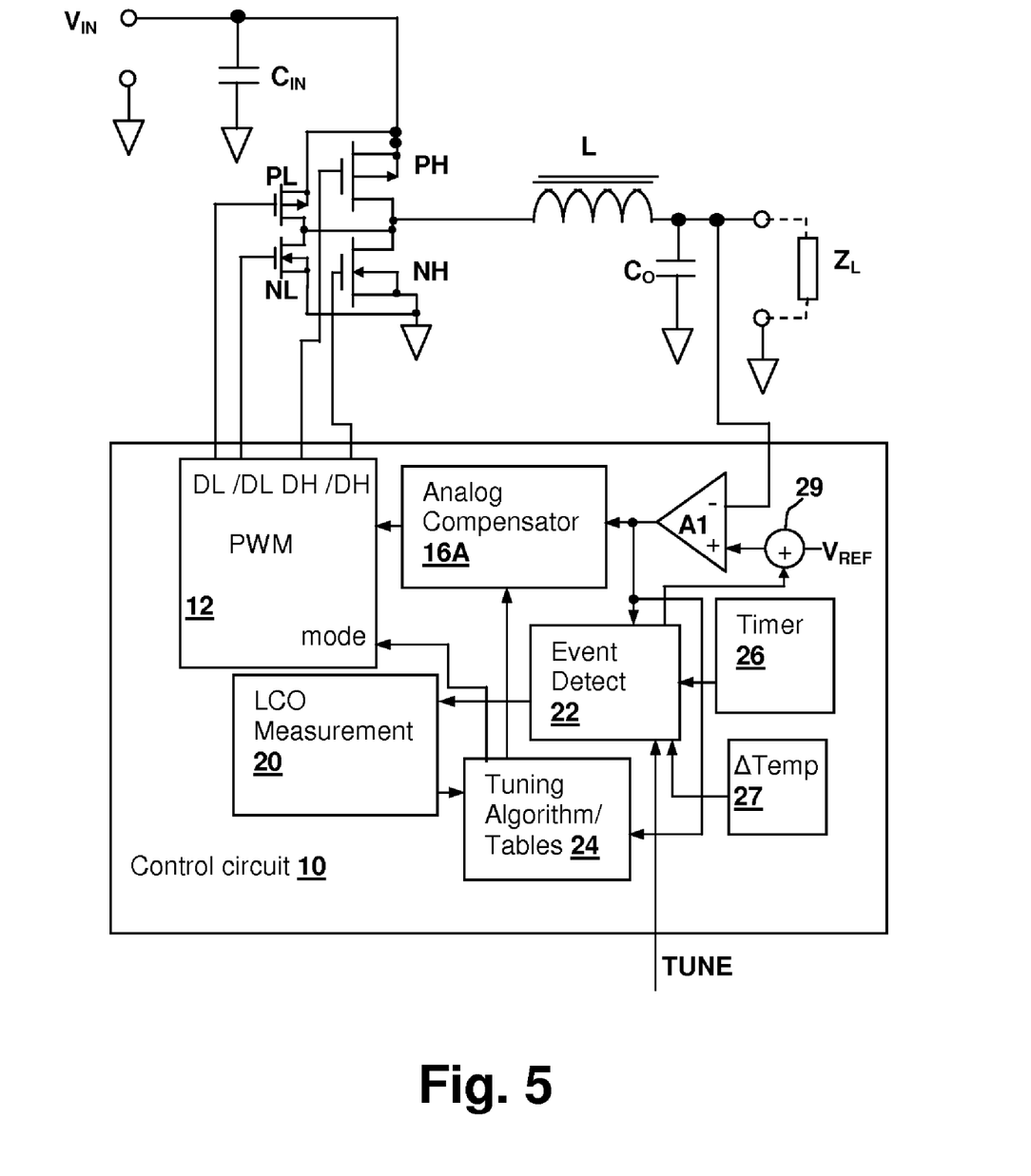
FIG. 5 is a schematic diagram depicting an SMPS in accordance with another embodiment of the invention.

Referring now to the FIG. 5, an SMPS in accordance with another embodiment of the present invention is shown. The depicted converter is a DC-to-DC buck converter similar to that depicted in FIG. 1, but an analog compensator 16A provides compensation of the SMPS. Only differences between the circuits of FIG. 1 and FIG. 5 will be described in detail below, otherwise operation and structure are the same. In the depicted embodiment, tuning algorithm/look-up tables 24 provides signals that adjust the response of analog compensator 16A by, for example, selecting resistors that set gain and corner frequencies and/or setting bias current levels for transconductance stages, and other known analog filter/compensator tuning techniques. Instead of an analog-to-digital converter, a traditional error amplifier A1 compares the output voltage to a reference voltage $V_{REF}$. A combiner 29 provides for introduction of a shift in the error signal by applying a voltage provided from or selected by event detector 22, which is used to initiate an LCO. In conformity with the digital techniques noted above, the shift in voltage can be selected as a step that will place the input of PWM 12 at the midpoint of a resolution cell by determining the voltage step from the output of analog compensator 16A.

In any of the circuits described above, the upper useful limit for improving the transient response of the SMPS is the critical bandwidth, as described above. For a particular SMPS topology, control mode and compensation type, the minimum output capacitance and inductance values can be calculated. For example, in a type 3 compensator (2 LC resonance canceling zeros and two rolloff poles) voltage-mode buck converter, $$Co = \frac{1 + (f_c/f_{cb})^2 I}{8 f_c V}$$

Where $C_O$=output capacitance, $f_c$=crossover bandwidth, $f_{cb}$=critical bandwidth and I, V are the current and voltage magnitudes of a transient. From the above formula, a minimum value of capacitance can be determined from a maximum allowable transient voltage step for a specified load current step with a specified crossover bandwidth and critical bandwidth. However, with the auto-tuning capabilities described above, $f_c$ can be adjusted and further, $f_{cb}=\frac{1}{4}R_{esr}C_O$ so that if $C_O$ and $R_{esr}$ are determined from the LCO measurements as described above, the minimum $f_c$ up to $f_{cb}$ can be determined during converter operation. Further, to provide a minimized capacitor size and cost (i.e., a minimum capacitance), the ability to control the response to maintain a constant $f_c$ up to $f_{cb}$ with variations in $C_O$, provides a lower minimum $C_O$.

The crossover frequency can also be adjusted to maintain a constant relationship between the dI, dV transient magnitudes as $F_{cb}$ and dV vary. The following expression provides a control value for $F_c$ for the above described buck converter example, which can be set by adjusting the response of compensator 16 of FIG. 1 or 16A of FIG. 5:

$$f_c = -\frac{8dVC_o f_{cb}^2}{dI} + \sqrt{\left(\frac{8dVC_o f_{cb}^2}{dI}\right)^2 - 4f_{cb}^2}$$

A critical inductance value is also determined for a particular design according to:

$$L = \frac{V_{in}}{4 dI F_c} \min(D, 1-D)$$

Where dI is the output current ripple, $V_{in}$ is the buck converter input voltage and D is the duty factor. Variations in L are also reduced in effect by the ability to tune $f_c$, since decreases in L can be compensated by increases in $f_c$.

The adjustable compensation of the present invention can further be used to reduce "audio susceptibility" of the SMPS, which is variation of output voltage and/or current with input voltage variation. Since the input voltage can be measured or determined from other parameters, the compensation can be precisely tuned to eliminate or at least substantially reduce variation of the output voltage and/or current due to input voltage variation. Such adjustment is difficult or impossible to achieve without the ability to extract parameters of the converter, especially when the parameters change over time, temperature and operating conditions.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A switch-mode power supply, comprising:
a magnetic storage element;
a switching circuit coupled to said magnetic storage element for energizing said magnetic storage element;
a capacitive storage element coupled to said magnetic storage element, wherein said capacitive storage element is charged by a current transferred from said magnetic storage element to provide an output terminal adapted for coupling to a load;
a sensing circuit for sensing at least one of a current and a voltage provided at said output terminal;

a parameter extraction circuit for measuring parameters determinative of a characteristic response of said switch-mode power supply during regulative operation of said switch-mode power supply; and a control circuit having an input coupled to an output of said sensing circuit and an output coupled to said switching circuit, for controlling said switching circuit in accordance with a compensating response, and wherein said control circuit adjusts said compensating response in conformity with an output of said parameter extraction circuit, wherein as said characteristic response changes due to variations in said parameters, said compensating response is also changed.

2. The switch-mode power supply of claim 1, wherein said control circuit adjusts said compensating response to maintain transients in said voltage at said output terminal below a predetermined threshold magnitude for a predetermined change in output current at said output terminal.

3. The switch-mode power supply of claim 1, wherein said control circuit adjusts said compensating response to maximize a crossover bandwidth of said switch-mode power supply.

4. The switch-mode power supply of claim 3, wherein said control circuit adjusts said compensating response such that said crossover bandwidth does not substantially exceed a critical bandwidth determined by parameters of said capacitive storage element.

5. The switch-mode power supply of claim 1, wherein said control circuit adjusts said compensating response to maintain a substantially constant phase margin of said switch-mode power supply.

6. The switch-mode power supply of claim 1, wherein said parameter extraction circuit periodically updates said parameters, and wherein said control circuit adjusts said compensating response in response to an update of said parameters.

7. The switch-mode power supply of claim 1, further comprising an event detector that detects an event, wherein said parameter extraction circuit updates said parameters and said control circuit adjusts said compensating response in response to said event detector detecting said event.

8. The switch-mode power supply of claim 7, wherein said event is a logical input signal for commanding an update of said compensating response, and wherein said event detector detects a change in state of said logical input signal.

9. The switch-mode power supply of claim 7, wherein said event is a transient voltage spike at said output terminal, and wherein said event detector detects at least one characteristic value of said transient voltage spike and compares said at least one characteristic value to a threshold and signals said event if said at least one characteristic value exceeds said threshold.

10. The switch-mode power supply of claim 1, wherein said parameter extraction circuit measures characteristics of limit cycle oscillations of said switch-mode power supply.

11. The switch-mode power supply of claim 10, wherein said control circuit comprises a modulator for controlling said switching circuit according to a series of discrete-valued steps, and wherein said control circuit reduces a resolution of said modulator to introduce said limit cycle oscillations in response to a control signal.

12. The switch-mode power supply of claim 10, wherein said parameter extraction circuit measures an amplitude of said limit cycle oscillations.

13. The switch-mode power supply of claim 10, wherein said parameter extraction circuit measures a frequency of said limit cycle oscillations.

14. The switch-mode power supply of claim 1, wherein said parameter extraction circuit measures a rate of change of current through said magnetic storage element to determine an inductance of said magnetic storage element, and wherein said compensating response is further adjusted in conformity with said determined inductance.

15. The switch-mode power supply of claim 1, wherein said switching circuit is segmented into high current and low current switch segments, and wherein selection of operation of said high current switch segments is selected in conformity with an output of said parameter extraction circuit.

16. The switch-mode power supply of claim 1, further comprising a circuit for sensing a input voltage at an input to said switching circuit, and wherein said control circuit further adjusts said compensating response in conformity with said input voltage.

17. The switch-mode power supply of claim 16, wherein said compensating response is tuned to cancel a variation in magnitude of said input voltage at one or more specific frequencies.

18. The switch-mode power supply of claim 1, further comprising a bus interface for providing output of said parameters to an external device.

19. A method of operating a switch-mode power supply, comprising:

measuring parameters determinative of a characteristic response of said switch-mode power supply during regulative operation of said switch-mode power supply; and responsive to completing said measuring, adjusting a compensating response of a feedback control of a switching circuit of said switch-mode power supply in conformity with said measured parameters, wherein as said characteristic response changes due to variations in said parameters, said compensating response is also changed.

20. The method of claim 19, wherein said adjusting adjusts said compensating response to maintain a transient voltage magnitude at an output of said switch-mode power supply below a threshold magnitude for a predetermined change in current at said output of said switch-mode power supply.

21. The method of claim 19, wherein said adjusting adjusts said compensating response to maximize a crossover bandwidth of said switch-mode power supply.

22. The method of claim 19, wherein said adjusting adjusts said compensating response such that said crossover bandwidth does not substantially exceed a critical bandwidth determined by parameters of a capacitive storage element of said switch-mode power supply.

23. The method of claim 19, wherein said adjusting adjusts said compensating response to maintain a substantially constant phase margin of said switch-mode power supply.

24. The method of claim 19, wherein said measuring is performed periodically.

25. The method of claim 19, further comprising detecting an event, and wherein said parameter extraction circuit updates said parameters and said control circuit adjusts said compensating response in response to said detecting.

26. The method of claim 25, wherein said detecting detects a state of a logical input signal for commanding an update of said compensating response.

27. The method of claim 25, wherein said detecting detects at least one characteristic value of a transient voltage spike at said output terminal, and wherein said method further comprises:

comparing said at least one characteristic value to a threshold; and signaling said event if said at least one characteristic value exceeds said threshold.

28. The method of claim 19, wherein said measuring measures characteristics of limit cycle oscillations of said switch-mode power supply.

29. The method of claim 28, further comprising causing said limit cycle oscillations, and wherein said measuring is performed in response to said causing.

30. The method of claim 29, wherein said causing comprises reducing a resolution of a discrete-valued modulator that controls said switching circuit.

31. The method of claim 28, wherein said measuring comprises measuring an amplitude of said limit cycle oscillations.

32. The method of claim 28, wherein said measuring comprises measuring a frequency of said limit cycle oscillations.

33. The method of claim 19, wherein said measuring comprises measuring a rate of change of current through said magnetic storage element to determine an inductance of said magnetic storage element, and wherein said compensating response is further adjusted in conformity with said determined inductance.

34. The method of claim 19, wherein said switching circuit is segmented into high current and low current switch segments, and further comprising selecting operation of said high current switch segments in conformity with a result of said measuring.

35. The method of claim 19, further comprising sensing a input voltage at an input to said switching circuit, and wherein said adjusting further adjusts said compensating response in conformity with a result of said sensing.

36. The method of claim 35, wherein said adjusting tunes said compensating response to cancel a variation in magnitude of said input voltage at one or more specific frequencies.

37. A switch-mode power supply, comprising:
energy storage means for storing energy received from an input;
switching means for transferring energy stored by said storage means to a load;
control means for controlling said switching means according to a compensated response; and
measurement means for determining a characteristic response of said switch-mode power supply while said stored energy is being transferred to said load, and wherein said control means is responsive to said measurement means to adjust said compensated response, wherein as said characteristic response changes due to variations in said parameters, said compensating response is also changed.

38. The switch-mode power supply of claim 37, wherein said measurement means comprises means for measuring characteristics of limit-cycle oscillations of said switch-mode power supply.

39. The switch-mode power supply of claim 37, wherein said control means comprises means for introducing said limit cycle oscillations, whereby said measurement means measures said limit cycle oscillations in response to said introducing means introducing said limit cycle oscillations.

40. A switch-mode power supply, comprising:
a magnetic storage element;
a switching circuit coupled to said magnetic storage element for energizing said magnetic storage element;
a capacitive storage element coupled to said magnetic storage element, wherein said capacitive storage element is charged by a current transferred from said magnetic storage element to provide an output terminal adapted for coupling to a load;
a sensing circuit for sensing at least one of a current or a voltage provided at said output terminal;
a control circuit, for controlling said switching circuit in conformity with a compensating response, wherein said control circuit includes a selectable compensator for providing said compensating response; and
a limit-cycle oscillation measurement circuit for measuring characteristics of a limit-cycle oscillation present in a control variable of said control circuit, whereby characteristics of said switch-mode power supply are obtained, wherein said selectable compensator is selected as an integrator during operation of said limit-cycle oscillation measurement circuit, and wherein said integrator has a gain set such that a crossover frequency of said switch-mode power supply is less than a resonant frequency of said magnetic storage element with said capacitive storage element.

* * * * *